United States Patent [19]

Price

[11] 4,317,076
[45] Feb. 23, 1982

[54] POWER FACTOR CONTROL SYSTEM

[75] Inventor: Arthur L. Price, Canton, Ohio

[73] Assignee: Hilscher-Clarke Electric Co., Canton, Ohio

[21] Appl. No.: 132,074

[22] Filed: Mar. 20, 1980

[51] Int. Cl.³ .............................................. G05F 1/70
[52] U.S. Cl. ................................................. 323/210
[58] Field of Search ................... 307/34, 38; 323/119, 323/128, 205, 208, 209, 210

[56] References Cited

U.S. PATENT DOCUMENTS

| | | |
|---|---|---|
| 2,293,484 | 8/1942 | Anderson . |
| 3,002,146 | 9/1961 | Lorrig et al. . |
| 3,084,323 | 4/1963 | Sommer et al. . |
| 3,300,712 | 1/1967 | Segsworth . |
| 3,391,329 | 7/1968 | Meyer . |
| 3,489,882 | 1/1970 | Krackow . |
| 3,529,173 | 9/1970 | Verma . |
| 3,787,729 | 1/1974 | Bennett . |
| 4,055,795 | 10/1977 | Mathieu .......................... 323/128 X |

Primary Examiner—William M. Shoop
Attorney, Agent, or Firm—Frease & Bishop

[57] ABSTRACT

A control system for automatically adding and subtracting capacitors to and from an electrical supply line for regulating the power factor of the supply line. A three-phase transducer is connected to the supply line and supplies a signal in direct proportion to the VARs of the supply line to a double setpoint meter relay. The meter relay is connected to a pair of timing relays which are selectively energized in response to a capacitor "add" or "subtract" signal from the transducer. If the signal is maintained for a predetermined period of time on one of the timing relays, a motor of a respective "add" or "subtract" cam-actuated switch is activated. The cam switches are programmed to energize or deenergize control relays, which in turn actuate capacitor contactors to add or subtract the next available capacitor. The cam switches are in independent circuits so that the cycling of each capacitor is in a next-one-available cycle, whereby the first capacitor added is the capacitor which was removed the longest from the supply line, and the first capacitor removed is the capacitor which has been energized the longest. This sequence provides uniform usage of all the capacitors and the associated controls.

10 Claims, 4 Drawing Figures

POWER FACTOR CONTROL SYSTEM

BACKGROUND OF THE INVENTION

1. Field of the Invention

The invention relates to a control system for maintaining the power factor of an electrical supply line at a predetermined value. More particularly, the invention relates to a power factor control system using two cam-actuated stepping switches for adding or subtracting capacitors on or from the power supply line in a next-one-available cycle in which the first capacitor to be added is the capacitor which was removed the longest and the first capacitor to be removed is the capacitor which has been energized the longest, providing uniform usage for the capacitors and associated controls.

2. Description of the Prior Art

It is well known that a power distribution system may be operated with substantial savings if the power factor of the system is maintained close to unity. Poor power factor requires that a given load consumes more KVA than the same load would consume at a better power factor. This increase in KVA creates an increase in amperage, requiring larger wires, larger equipment such as transformers, switch gear, etc., without an increase in usable power (KW). For this reason, utility companies are permitted to charge customers an additional premium for a poor power factor.

It has become the practice for many industrial customers to install capacitors which will decrease the inductance KVAR which occurs in an electrical system primarily due to motor loads, transformers and other types of equipment which create an excessive amount of inductance resulting in a poor power factor. Common practice is to locate these capacitors near the equipment having the poor power factor, such as the motor or the transformer. If the capacitors are not placed directly in the motor circuit, the problem arises on the efficient control of the capacitors. If the capacitors remain on the power supply line at all times, it could result in a leading power factor, causing undesirable conditions such as high voltage. Therefore, many systems use time clocks or other control equipment for adding and subtracting capacitors on and from the system, as required. Since reliable capacitor controls are expensive, it is not efficient to correctly control capacitors at multiple locations. Therefore, power factor control capacitors usually are grouped at a central location and controlled by a common controller or control system.

There are various types of controllers and control systems which add and subtract capacitors on and from a power supply line in relationship to the KVAR of the supply line. Examples of such capacitor controllers and control systems are shown in U.S. Pat. Nos. 2,293,484, 3,002,146, 3,300,712 and 3,391,329. One disadvantage of known capacitor controllers and related systems, such as shown in the above-listed patents, is the manner in which the capacitors are added or subtracted from a supply line. Most known systems use a type of reversible control motor which will advance to add capacitors and will reverse to substract capacitors. This type of reversible switching will result in the capacitors being used in a last-on, first-off cycle. Accordingly, certain capacitors and their associated switching controls are used considerably more often than other capacitors and controls in the capacitor bank. This results in poor equipment usage, premature replacement, and increased maintenance.

Control systems for other types of electrical apparatus which are completely unrelated to capacitors and power factor correction have recognized this unequal equipment usage in connection with the adding and subtracting of electrical loads. Examples of these systems are described in U.S. Pat. Nos. 3,489,882, 3,529,173 and 3,787,729. These systems either require manual advancement of a rotary switch or elaborate electronic circuitry for achieving the desired uniform equipment usage.

Therefore, the need has existed for a power factor control system using electromechanical components which automatically adds and subtracts capacitors on and from an electrical supply line, which achieves uniform usage of the capacitors and associated controls by providing a last-on, last-off cycle. There is no known power factor control system which achieves this advantage by the use of two independent cam-actuated switching circuits which provide the desired switching cycle.

SUMMARY OF THE INVENTION

Objectives of the invention include providing an improved power factor control system for adding and subtracting individual capacitors from a bank of such capacitors onto and from an electrical supply line, wherein each of the capacitors and its associated control components receive uniform usage by a unique double cam-actuated switching circuit arrangement in which the capacitors are controlled in a next-one-available cycle; that is, the longest deenergized capacitor is the first capacitor to be added when a capacitor "add" response is received by one of the cam switch circuits, and in which the longest energized capacitor is the first capacitor removed when a capacitor "subtract" response is received; providing such an improved control system wherein the cam switches and control circuits can accommodate various numbers of capacitors which may be required for a particular installation, in which the cycle time for all capacitor switching can be altered to various values by selecting different speeds for the cam switch motor; providing such a control system in which each capacitor is added or removed from the line by its own contactor which is protected by its own set of fuses and disconnect switch, and in which each of the fuses is monitored continuously by voltmeters to indicate a blown fuse condition; providing such a control system in which an alarm circuit is provided for either signaling or controlling some load in the event an alarm condition should arise; providing such a control system in which the input signal to the control system is obtained from a three-phase VAR sensor, which is believed to achieve a better control than possible with existing single-phase control systems; providing such an improved control system in which the system is comprised of standard electrical and electromechanical components, with the exception of the input signal producing transducer, which components can be housed in a standard, approved metal enclosure which is easily installed and serviced; and providing such an improved power factor control system which eliminates difficulties existing in the art, satisfies needs and obtains new results in the art.

These objectives and advantages are obtained by the improved power factor control system which adds and subtracts capacitors to an electrical supply line, the general nature of which may be stated as including sensing means responsive to a predetermined load characteristic of the supply line to indicate when more or fewer capacitors are needed on the supply line by generating "add" and "subtract" signals; a plurality of contactor means each associated with a capacitor for electrically connecting or disconnecting said capacitors to or from the supply line; and first and second stepping switch means operatively connected to the sensing means and controlling the contactor means, said first switch means progressively adding capacitors on the electrical supply line in response to a capacitor "add" signal from the sensing means, with said added capacitors being the next available capacitors in a sequence to provide a first-in, longest-out pattern, and said second switch means progressively removing capacitors from said supply line in response to a capacitor "subtract" signal from said sensing means, with said removed capacitors being in a sequence to provide a first-out, longest-in pattern whereby said capacitors and associated contactor means receive uniform usage.

BRIEF DESCRIPTION OF THE DRAWINGS

A preferred embodiment of the invention—illustrative of the best mode in which applicant has contemplated applying the principles—is set forth in the following description and shown in the accompanying drawings, and is particularly and distinctly pointed out and set forth in the appended claims.

Similar numerals refer to similar parts throughout the drawings.

DESCRIPTION OF THE PREFERRED EMBODIMENT

Figure 1:
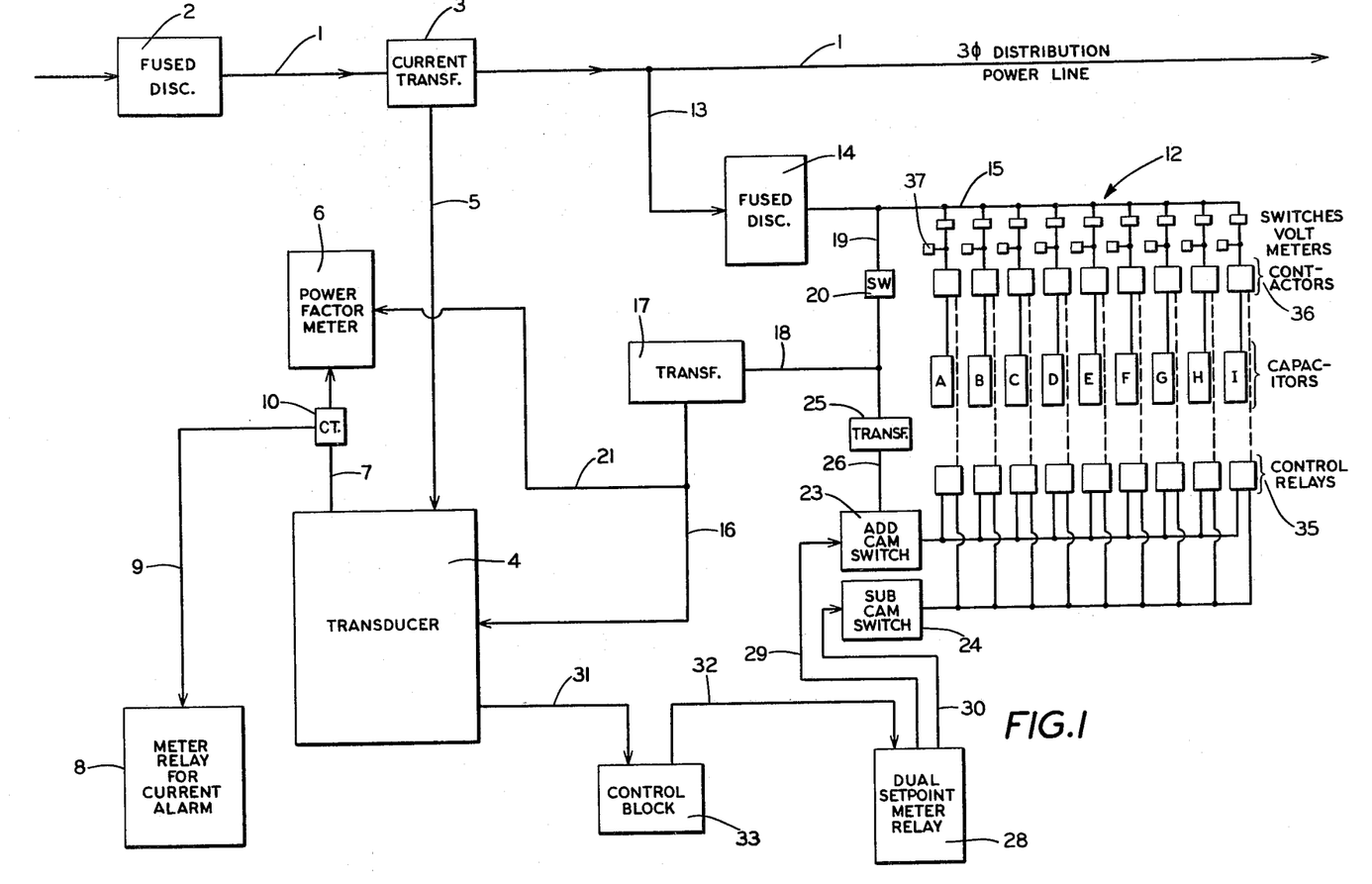
FIG. 1 is a diagrammatic block diagram of the improved power factor control system and associated capacitor bank.

A power distribution system and the improved power factor control system of the invention is shown in block diagram form in FIG. 1. Power is supplied to the particular installation, such as an industrial plant, from a main three-phase supply line 1. A usual fused disconnect switch 2 preferably is provided in line 1 ahead of the power factor control equipment.

The control system is electrically connected to main supply line 1 by current transformers 3 which are connected to a three-phase transducer 4 by line 5. A power factor indicating meter 6 is connected to transducer 4 by a line 7. A meter relay 8 for an alarm circuit is connected to line 7 by a line 9 and a current transformer 10. A capacitor bank, indicated generally at 12, which consists of nine capacitor stages designated by letters A through I, is connected to supply line 1 through line 13. A fuse disconnect switch 14 is located in line 13 ahead of a main capacitor bus line 15. The voltage input to transducer 4 is supplied by line 16, which is on the secondary side of a transformer 17, the primary side of which is connected to the capacitor power supply line 13 by lines 18 and 19. A switch 20 preferably is located in line 19 to permit electrical isolation of the above-described components, if necessary. The secondary voltage of transformer 17 also is supplied to power factor meter 6 by a line 21.

In accordance with one of the main features of the invention, capacitor bank 12 is controlled by a pair of cam switches 23 and 24, which are connected to the secondary of a transformer 25 by a line 26. The primary of transformer 25 is connected to main supply line 1 by lines 13 and 19. The inputs to cam switches 23 and 24 are supplied from a dual setpoint meter relay 28 through lines 29 and 30, respectively. Transducer 4 produces an analog output signal in direct relationship to the KVAR of line 1, which is received by meter relay 28 through lines 31 and 32. A control block 33 for the band width calibration of meter relay 28 is located between lines 31 and 32.

Cam switches 23 and 24, which are referred to as capacitor "add" and capacitor "subtract" switches, respectively, either add or subtract capacitors A-I on or from supply line 1 through respective control relays 35 and contactors 36. A capacitor status-indicating voltmeter 37 is connected to each capacitor stage. In accordance with one of the main features of the invention, cam switches 23 and 24 will add and subtract capacitors from main supply line 1 in a next-one-available cycle, whereby the first capacitor to be added is the capacitor which has been removed the longest from the supply line and the first capacitor to be removed is the capacitor which has been energized or connected to the supply line the longest. This sequence provides uniform usage of all the capacitors and their associated controls.

Still referring to FIG. 1, the broad operation of the improved power factor control system is as follows. Transducer 4 continuously monitors the power factor or VARs of main supply line 1, receiving its input through current transformer 3 and potential transformer 17, and correspondingly, through lines 5 and 16. Transducer 4 produces an output analog signal on line 31 in direct proportion to the VARs occurring in supply line 1 to meter relay 28, which has two output relays which activate whenever their setpoints are exceeded. The setting for the contacts of meter relay 28 is by means of setpoint adjustments on the face thereof.

Depending upon which of the meter relay setpoints is exceeded, a signal is supplied to either cam switch 23 or 24. If this signal is sustained for a predetermined period of time, the respective cam switch is actuated, which will either energize or deenergize the appropriate control relay 35, which in turn triggers a capacitor contactor 36 to add or subtract the next available capacitor A-I on or from main supply line 1, following the above-described sequence.

The improved power factor control system and the components thereof are described in greater detail below and are shown in the schematic diagrams of FIG. 2-2A and the cam switch development chart of FIG. 3. Also, various types of equipment, voltages and details are set forth below describing one particular application in which the improved control system is used. The particular equipment, voltages, etc., are set forth for illustrative purposes only and can be modified for various applications in which the improved control system may be used without affecting the concept of the invention.

Three-phase supply line 1 includes three phase conductors 40 and a neutral wire 41, and is the secondary supply from a three-phase distribution transformer (not shown), operating at 277/480V, which is a usual voltage used to operate various plant equipment. Fused disconnect 2 includes three individual disconnect switches 42 and associated fuses 43 for the three phase conductors 40. Current transformer 3 includes three single phase current transformers 44, one for each phase conductor 40. Transducer 4 is a usual three-phase transducer of the type sold by General Electric Company under the designation "Type 4724 VAR Transducer," which produces a DC output current in proportion to the AC input power. Transducer 4 receives its input current through line 5 and its input voltage through line 16.

Fused disconnect 14, located in the main power supply line 13 of capacitor bank 12, includes three single-phase disconnect switches 45 and associated fuses 46. An auxiliary contact 47 is associated with disconnect switches 45 and is closed when disconnect switches 45 are closed and is opened just prior to the opening of switches 45. Contact 47 is in the capacitor control circuit on the secondary side of transformer 25 (FIG. 2). Contact 47 will deenergize all capacitors on supply line 1 upon opening of switches 45 by completely deenergizing the capacitor control circuit to prevent arcing from occurring at switches 45 due to the heavy current being created by the energized capacitors. Transformer 17 is protected on its primary side by three phase conductor fuses 49. Transformer 17 preferably is a three-phase Y—Y connected bank of transformers rated at 277/480×115/199V. Transformer 25 is connected across two phases of the supply voltage with its high side being protected by two phase fuses 50 and has a rating of 480/120V. A single fuse 51 provides secondary protection for transformer 25.

Power factor meter 6 is a usual type of power factor meter providing a visual, easily readable indication of the instantaneous power factor of the main three-phase supply line 1. Meter 6 is not used to control any component of the improved control system as does meter 28, but only provides a visual reading of the existing power factor. Power factor meter 6 may be of the type sold by the General Electric Company under Catalog No. 50-112 402 FDAD.

Control block 33 includes a four-point terminal block 52 with a pair of control resistors 53 and 54 mounted thereon. The values of resistors 53–54 control the bandwidth calibration of meter relay 28. Meter relay 28 may be of the type sold by the General Electric Company under its trademark BIG LOOK, Type 195. Meter relay 28 includes a pair of internal relays (not shown) for the high and low setpoint settings, respectively. Each of these relays, in turn, controls a pair of contacts 56–57 and 58–59. The meter relay's low setpoint relay (part of meter relay 28) actuates normally open contact 56, located in a capacitor add timing circuit associated with cam switch 23, and a normally closed contact 57, located in the capacitor subtract timing circuit of cam switch 24. The meter relay's high setpoint relay (part of meter relay 28) controls a normally closed contact 58 and a normally open contact 59 in the timing circuits of cam switches 23 and 24, respectively.

Therefore, under normal operating conditions, the power factor of supply line 1 is continuously monitored by transducer 4 with a visual indication being available on power factor meter 6. A signal is continuously supplied from transducer 4 by lines 31 and 32 by meter relay 28. Upon either the add (low) or subtract (high) contact setpoint of meter 28 being reached due to a predetermined change in the power factor of supply line 1, the meter relay will operate contacts 56 and 57 or contacts 58 and 59 to initiate a timer 60 or 61 in the circuitry of the selected cam switch 23 or 24, as described more fully below.

Timers 60 and 61 actuate contacts 62 and 63, respectively, after a predetermined time period, such as thirty seconds. The add or subtract signal must be continuously applied from meter relay 28 during this time period to maintain contact pairs 56 and 57 or 58 and 59 actuated. This prevents a sudden change in power factor for a short time period (less than thirty seconds) from prematurely adding or subtracting capacitors. Closure of contacts 62 or 63 will actuate a timing motor 64 or 65 of cam switches 23 and 24, respectively.

Figure 2:
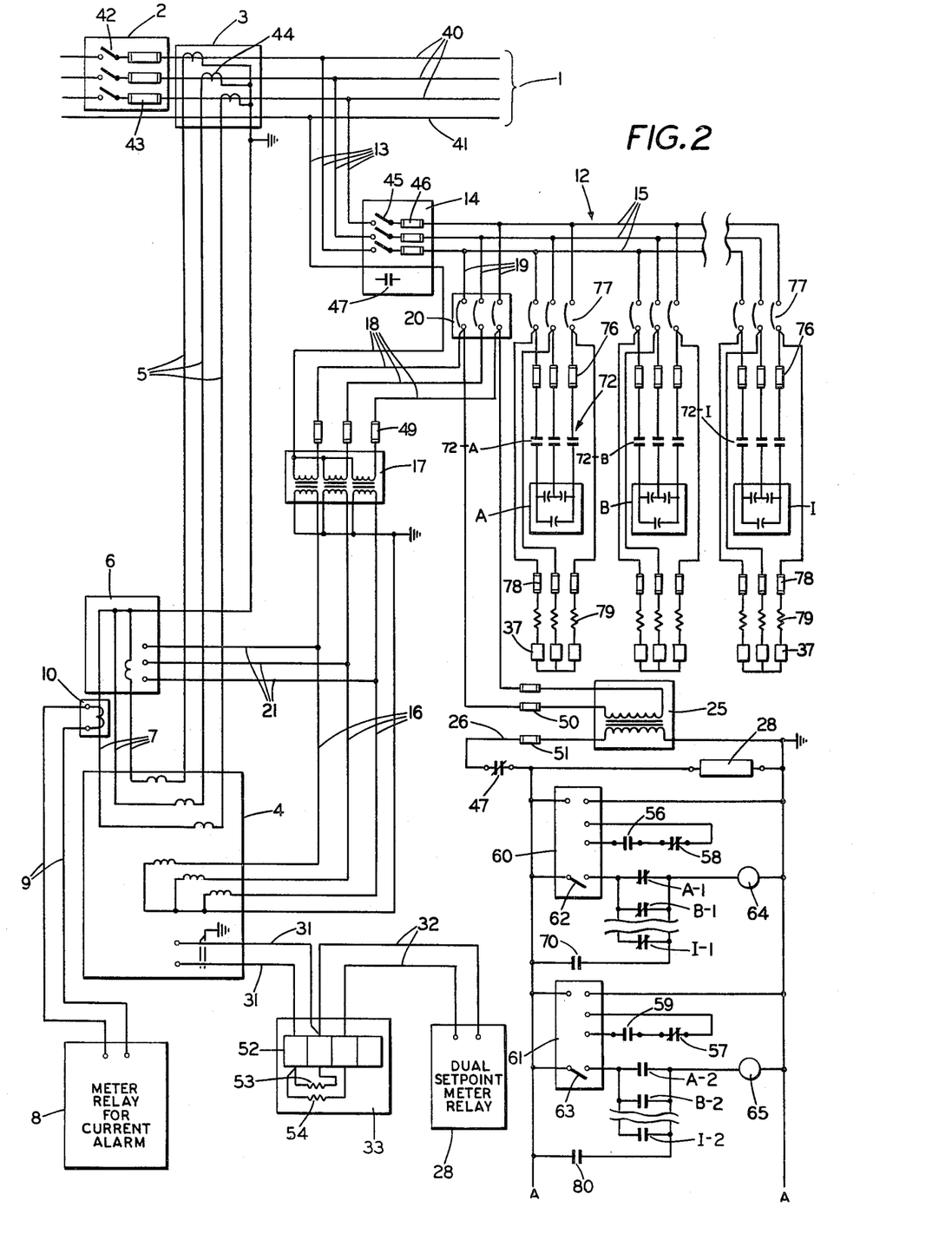
FIG. 2 and 2A is a schematic circuit diagram of the preferred embodiment of the improved power factor control system.
Figure 2A:
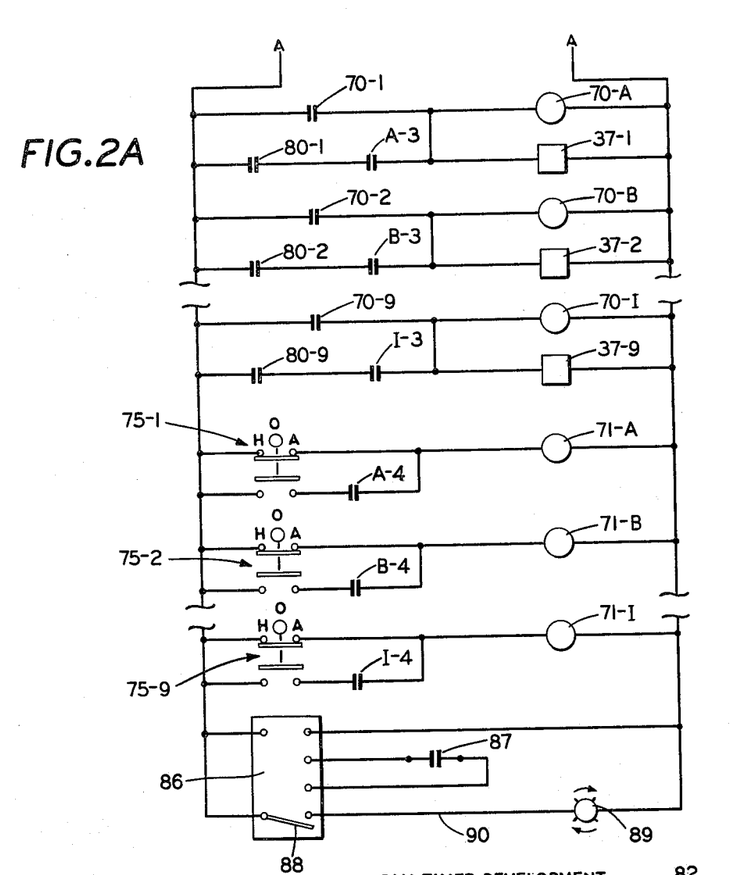
Figure 3:
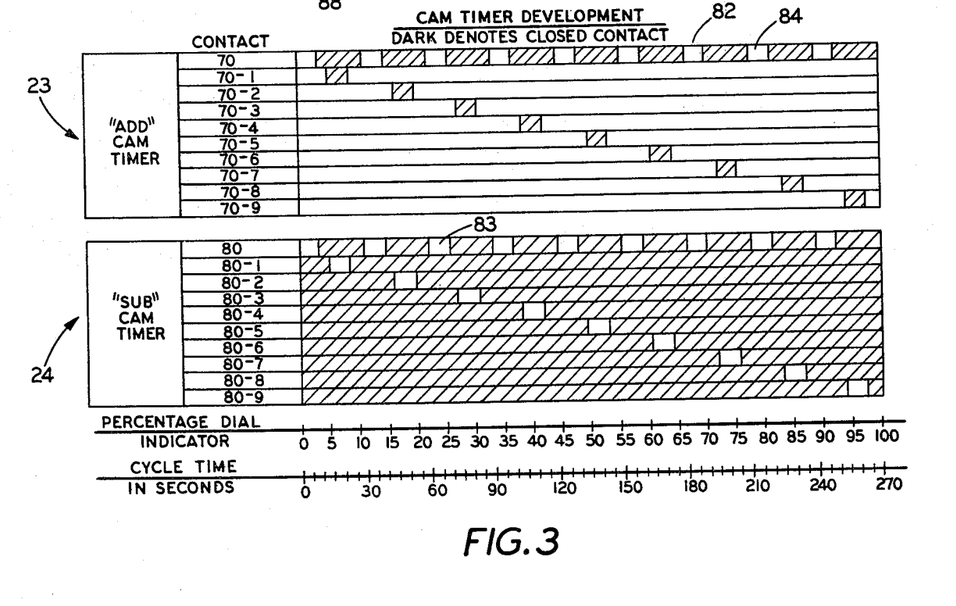
FIG. 3 is a diagrammatic chart illustrating the progressive sequence operation of the cam-actuated switches of the improved control system.

Each timing circuit has a normally open seal-in contact 70 and 80, each of which is in parallel with individual capacitor relay contacts (only three of which are shown in detail for simplicity instead of the nine capacitor stages shown in FIGS. 1 and 3) designated by A-1, B-1, and I-1, in the capacitor add circuit and by A-2, B-2 and I-2 in the capacitor subtract circuit. These contacts are arranged in parallel with respect to each other with the capacitor add circuit contacts being normally closed and the capacitor subtract contacts being normally open. Each of the capacitor contact pairs, A-1 & A-2, B-1 & B-2 and I-1 & I-2, is controlled by a respective relay coil 70 of control relay 35 (FIG. 2A) designated individually as 70-A, 70-B and 70-I. Each of these coils also controls two additional contacts which are also designated by the notations A-3 & A-4, B-3 & B-4 and I-3 & I-4, which are located in the circuitry of indicating voltmeters 37 and in the circuitry with the coils 71 of contactors 36. Each contactor coil 71 controls an associated contactor contact 72 (FIG. 2). The mode of operation of these various relay contacts and cam switches is described below, with particular reference to FIGS. 2, 2A and 3.

Assume for purposes of illustration that a capacitor add signal is generated from transducer 4 of sufficient magnitude to actuate the add (low) setpoint contact of meter relay 28. Actuation of this meter relay will close contact 56 in the timer add circuit energizing timer 60 since contact 58 is already closed. Simultaneously, normally closed contact 57 will open in the capacitor subtract timing circuit to prevent any possibility of both the capacitor add and subtract timing circuits being energized at the same time.

Timer 60 will close its contact 62 after passage of the preset time delay (thirty seconds) which will actuate cam timer motor 64 if one of the capacitor contacts A-1, B-1 . . . I-1 is closed in order to complete an electrical path to cam switch timer motor 64. Capacitor contacts A-1, B-1 . . . I-1 are normally closed contacts when their respective capacitors are deenergized, i.e., not connected to power supply line 1. Thus, if all nine capacitors are already on line, contacts A-1, B-1 . . . I-1 will be open, thereby preventing cam switch timer motor 64 from being energized to attempt to add other capacitors, none of which are available.

Assume capacitor A is deenergized and is the next capacitor to be added. Contact A-1 will be closed enabling cam timer motor 64 to be energized. Cam timer motor 64 will begin to rotate, and after a predetermined number of revolutions equivalent to ten seconds, will actuate seal-in contact 70 (FIGS. 1 and 3) for a period of twenty seconds of operation of timer 64. Continued rotation of cam timer motor 64 for an additional five seconds after closing contact 70 closes another capacitor control contact 70-1 (FIG. 2A) at the fifteen-second interval for a period of ten seconds, whereupon it is reopened at the twenty-five-second interval. Thus, when contact 70 seals in, contact 70-1 will give a ten-second "on" pulse to control relay coil 70-A which seals itself in by closing contacts A-3.

Coils 70-A and voltmeter 37-1 which is in parallel with coil 70-A will remain on until total power outage occurs (which is an abnormal condition) or when contact 80-1 opens. Contact 80-1 operates similar to contact 70-1, except as shown in the cam timer development chart of FIG. 3A, contact 80-1 is normally closed and will open only when the capacitor subtract timer motor 65 is revolving through the fifteen to twenty-five-second portion of its signal. Capacitor subtract timer motor 65 operates when timer 61 has timed out closing its contact 63 and at least one of the relay contacts A-2, B-2 . . . I-2 is closed, which occurs when their respective capacitor is energized.

When capacitor control relay coil 70-A is energized, as described above, it energizes its associated capacitor contactor coil 71-A by closing contact A-4, which actuates contactor contacts 72-A (FIG. 2). Contactor contact 72-A energizes or electrically connects capacitor A on line 12 assuming its associated selector switch 75-1 is in the automatic mode position. Contact A-4, which is in series with selector switch 75-1, had been closed upon relay coil 70-A being energized. After capacitor A is energized, the power factor of line 1 will change, causing the meter of meter relay 28 to move to a new position. If this new position is enough to satisfy the meter relay's setpoints, meter relay contact 56 will open deenergizing timer 60, which in turn will open its contact 62, which deactivates switch motor 64.

If the addition of capacitor A on line 1 does not satisfy the setpoints of meter relay 28 when sealing contact 70 reopens, as described above, contact 70 will not turn off timer motor 64, since timer contact 62 will still be closed.

The capacitor subtract operation is very similar to that described above. When the capacitor subtract (high) setpoint of meter relay 28 is reached, subtract timer 61 is energized by closing contact 59 and opening contact 58. After timer 61 has timed out (thirty seconds), its contact 63 closes, which will energize timer motor 65 of capacitor subtract cam switch 24 by completion of an electrical path through the appropriate contact A-2, B-2 . . . I-2, which contacts are closed when their respective capacitor is energized. Thus, if no capacitors are on line when a subtract signal is received, timer motor 65 will not be energized since no contact A-2 through I-2 is closed which enables timer motor 65 to be energized.

Motor 65 advances cam switch 24 forwardly and after a ten-second delay interval (FIG. 3) will close seal-in contact 80. After passage of an additional five-second time period, the appropriate capacitor contact 80-1, 80-2 . . . 80-9 (FIG. 2A) is actuated (moved to an open position), which deenergizes its associated control relay 70-A, 70-B, etc. When the appropriate control relay 70 is deenergized, for example relay 70-A, its corresponding contacts A-1, A-2, A-3 and A-4 change conditions, which if selector switch 75-1 is in the automatic mode, will deenergize previously energized capacitor contactor coil 71. Opening of contact A-4 will deenergize contactor coil 71-A which will open contactor contacts 72-A, electrically removing capacitor stage A from supply line 1.

In accordance with the main feature of the invention, each stepping switch 23 and 24 is controlled by an independent circuit which advances the switch to its next position when energized to either add or subtract the next available capacitor. As a further example, assume that add cam switch 23 is stopped at a position indicated at 82 and subtract cam switch 24 is at a position indicated at 83 (FIG. 3). In these positions, only capacitors C, D, E and F will be energized and on line. When a capacitor add signal is received, cam switch 23 will advance to at least a new position 84, energizing capacitor G. If additional capacitors are required to be added on line 1, cam switch 23 continues to move forward adding capacitors H and I and then capacitors A, B, etc. Likewise, when a capacitor subtract signal is received, cam switch 24 advances forwardly, subtracting capacitors C, D, E, etc. in that sequence. Thus, both cam switches advance forwardly completely independent of the position of the opposite cam switch to either add or subtract capacitors from supply line 1. Thereby, each capacitor and its associated control equipment described above, such as the various contacts, coils, relays, etc., receive uniform usage, which achieves the desired advantages previously described.

Another advantage of the improved factor control system is the use of selector switches 75-1, 75-2 . . . 75-9 in each of the capacitor contactor coil circuits. These switches preferably are of the three position mode and are of the type sold by the Allen Bradley Company under its Catalog No. 800T-J2A. This is a manually set switch having Hand (H), Off (O) and Automatic (A) positions which enables the associated capacitor contactor 36 to be placed in either of these three modes. The normal operating position for switches 75 is in the automatic mode, with the off mode being used when the particular capacitor controlled thereby is being removed from the system for some reason, and the hand mode being used when maintenance is being performed on the various equipment.

Cam switches 23 and 24 is of the type sold by Automatic Timing & Control Company, of King of Prussia, Pa., under its designation Series 324C and referred to as an adjustable cam programmer with multiple precision switches. This switch consists broadly of a motor, which is indicated in the drawings and described above by numerals 64 and 65, which motor rotates a shaft having a plurality of adjustable split cams mounted thereon which actuate a series of switches in progression as the shaft and cams are rotated by the timing motor. Other types of stepping or cam-actuated switches could be used to achieve the desired effects. Also, these cam times can be concatenated to accommodate any number of cam switches and capacitor stages. Likewise, the total cycle time for all stages can be altered to different values by selecting various speeds for the cam timer by selecting different motor speeds and/or gearing arrangements.

Another feature of the improved power factor control system is the protection of each contactor 36 by its own set of fuses 76 (FIG. 2). Also, each capacitor stage has its own manual disconnect switch 77 to permit electrical isolation of each stage if desired for maintenance purposes such as to replace a blown fuse 76, damaged capacitor, voltmeter 37, etc. Furthermore, each fuse 76 is monitored continuously by its own voltmeter 37 to indicate a blown fuse condition. Each voltmeter in turn has associated with it its own protection fuse 78 and resistor 79 which establishes the bandwidth of its respective voltmeter 37. Voltmeters 37 preferably are located in a metal enclosure cabinet at a readily accessible location to provide a visual indication to an operator or inspector that a particular capacitor is inoperative due to a blown fuse condition.

Another feature of the improved power factor control system is an alarm circuit sensitive to the amperage of the main power circuit. The voltage of the system generally will remain constant so that a change in amperage will result in a proportional change in KVA. A meter relay 8, which is calibrated and scaled to indicate the instantaneous KVA occurring in main power line 1, has an adjustable high setpoint contact 87 which triggers a timer 86 (FIG. 2A) upon the instantaneous KVA of line 1 exceeding the setpoint value. Timer 86 has an adjustable time period and if this excessive KVA is maintained on meter 8 for a preset time period, it will actuate timed relay contact 88. Closing of the timed relay contact 88 sounds an indicating alarm 89 by completing the circuit thereto through line 90. Alarm 89 may be audible or visual, or alternatively, could actuate and control other equipment or components in the system.

This KVA alarm serves a two-fold purpose; namely, to create an alarm if the KW portion of the KVA is excessive and to create an alarm if the KVAR portion of the KVA is excessive. The KW-created alarm indicates that excessive power is being consumed in the main power circuit and can be used similar to an energy demand controller. A KVAR alarm indication indicates that the capacitors are inoperative. Since the input for the alarm is strictly amperage related, it pertains equally to the system KVA, KW and KVAR, as discussed above, and in actuality is an amperage alarm with a time delayed output.

Another advantage of the improved power factor control system is the "dumping" of all capacitors which are on line in the event of a power outage, which after corrected, will put the required number of capacitors back on the line automatically. If a power outage occurs, power to the capacitor control circuits which is provided by the secondary output of transformer 25 is removed, which deenergizes the control relay coils 70 and the contactor relay coils 71, opening contactor contacts 72. After power is restored, the capacitors are added to the line by following the usual mode of operation discussed previously above.

Again, the main advantage of the above-described system is the use of the two independent cam timer switch circuits for adding and subtracting the capacitor on and from the main circuit. The capacitors are added in a sequence to provide a first-in, longest-out pattern, and are progressively removed in a sequence to provide a first-out, longest-in pattern, to achieve uniform usage of the capacitors and their associated controls.

Accordingly, the improved power factor control system is simplified, provides an effective, safe, inexpensive, and efficient arrangement which achieves all the enumerated objectives, provides for eliminating difficulties encountered with prior systems, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved power factor control system is constructed and used, the characteristics of the system, and the advantageous, new and useful results obtained; the new and useful structures, devices, elements, arrangements, parts, and combinations, are set forth in the appended claims.

I claim:

1. A control system for adding and subtracting capacitors to an electrical supply line including:
   (a) sensing means for generating signals in response to the load characteristic of the supply line;
   (b) dual setpoint relay means operatively connected with the sensing means for receiving the signals generated thereby to indicate when more or fewer capacitors are needed on the supply line by generating "add" and "subtract" signals upon one of the setpoints being reached;
   (c) a plurality of contactor means each associated with a capacitor for electrically connecting or disconnecting said capacitors to or from the supply line; and
   (d) first and second cam timer stepping switch means operatively connected to the dual setpoint relay means and controlling the contactor means, said first switch means progressively adding capacitors on the electrical supply line in response to capacitor "add" signals from the relay means, with said added capacitors being the next available capacitors in a sequence to provide a first-in, longest-out pattern, and said second switch means progressively removing capacitors from said supply line in response to capacitor "subtract" signals from said relay means, with said removed capacitors being in a sequence to provide a first-out, longest-in pattern whereby said capacitors and associated contactor means receive uniform usage.

2. The control system defined in claim 1 in which the sensing means includes a three-phase VAR transducer; in which said transducer generates a signal proportional to the input power and with a polarity dependent upon a leading or lagging power factor; and in which the signal is supplied to the dual setpoint relay means to actuate said relay means upon one of the setpoints being reached.

3. The control system defined in claim 1 in which a timing means is operatively connected between the dual setpoint relay means and each of the stopping switch means; in which a respective one of the timing means is actuated in response to a respective one of the relay means setpoints being reached; in which the timing means each have a contact which is actuated after elapse of a preset time period, during which time period a capacitor "add" or "subtract" signal is continuously generated by the sensing means; and in which actuation of one of the timing means contact energizes one of the contactor means to either connect or disconnect a capacitor from the supply line, depending upon which of the relay means setpoints was reached.

4. The control system defined in claim 3 in which each of the timing means includes a pair of contacts which are electrically interconnected with the contact pair of the other timing means to prevent both of said timing means from being activated at the same time.

5. The control system defined in claim 3 in which each of the stepping switch means has a motor; and in which each of said motors is energized in response to actuation of its respective timing means contact.

6. The control system defined in claim 3 in which each of the contactor means includes a first relay coil and associated first group of contacts which electrically connect and disconnect a capacitor on and from the supply line, and a second relay coil and associated second group of contacts which are operated by the timing means contacts; and in which operation of the second coil and associated second group of contacts operates the first relay coil and associated first group of contacts.

7. The control system defined in claim 6 in which the second relay coil controls four pairs of contacts comprising the second group of contacts.

8. The control system defined in claim 1 in which a voltmeter is operatively connected with each capacitor to provide a visual on-line or off-line status indication of each capacitor.

9. The control system defined in claim 1 in which a current-actuated alarm is connected with the sensing means to provide an indication of an abnormal condition occuring in the electrical supply line.

10. A control system for adding and subtracting capacitors to an electrical supply line including:
(a) sensing means responsive to a predetermined load characteristic of the supply line to indicate when more or fewer capacitors are needed on the supply line by generating "add" and "subtract" signals;
(b) a plurality of contactor means each associated with a capacitor for electrically connecting or disconnecting said capacitors to or from the supply line, each of said contactor means including a control coil and a plurality of control contacts operated by said control coil with certain of said control contacts being maintained in a closed position when the control coil is energized to electrically connect a capacitor on the supply line and with other of said control contacts being maintained in an open position when said control coil is energized; and
(c) first and second stepping switch means operatively connected to the sensing means and controlling the contactor means, said first switch means progressively adding capacitors on the electrical supply line in response to capacitor "add" signals from the sensing means, with said added capacitors being the next available capacitors in a sequence to provide a first-in, longest-out pattern, and said second switch means progressively removing capacitors from said supply line in response to capacitor "subtract" signals from said sensing means, with said removed capacitors being in a sequence to provide a first-out, longest-in pattern whereby said capacitors and associated contactor means receive uniform usage.

* * * * *

UNITED STATES PATENT AND TRADEMARK OFFICE
CERTIFICATE OF CORRECTION

PATENT NO. : 4,317,076
DATED : February 23, 1982
INVENTOR(S) : Arthur L. Price

It is certified that error appears in the above-identified patent and that said Letters Patent are hereby corrected as shown below:

Column 5, line 63, change "by" (2nd. occurrence) (preceding "meter") to -to-

Column 8, line 23, add -power- after "improved" and before "factor"

Column 8, line 50, change "times" to -timers-

Column 10, line 52, change "stopping" to -stepping-

Column 10, line 60, change "contact" to -contacts-

Column 9, line 49, change "capacitor" to -capacitors-

Signed and Sealed this

Twentieth Day of April 1982

[SEAL]

Attest:

GERALD J. MOSSINGHOFF

Attesting Officer   Commissioner of Patents and Trademarks